United States Patent [19]
Padilla

[11] Patent Number: 5,808,276
[45] Date of Patent: Sep. 15, 1998

[54] DEVICE FOR UNATTENDED SIMULTANEOUS HEATING AND AGITATING OF A BOTTLE OF INFANT FORMULA

[76] Inventor: Ted A. Padilla, 129 Ruby Ct., Livermore, Calif. 94550

[21] Appl. No.: 740,326

[22] Filed: Oct. 28, 1996

[51] Int. Cl.[6] ..................................................... H05B 6/10
[52] U.S. Cl. ......................... 219/386; 219/201; 219/628; 219/652; 99/348; 392/446
[58] Field of Search ..................................... 219/201, 628, 219/629, 652, 753, 752, 385, 386; 99/348; 392/446

[56] References Cited

U.S. PATENT DOCUMENTS

| | | | |
|---|---|---|---|
| 2,142,599 | 1/1939 | Binder | 219/201 |
| 2,551,651 | 5/1951 | Vandewater | 219/201 |
| 2,650,980 | 9/1953 | Popow | 219/201 |
| 2,734,826 | 2/1956 | Stentz et al. | 99/212 |
| 4,503,307 | 3/1985 | Campbell et al. | 219/753 |
| 4,714,813 | 12/1987 | Trenchard | 219/753 |
| 4,931,610 | 6/1990 | Hughes et al. | 219/652 |
| 5,306,896 | 4/1994 | Glater et al. | 219/521 |

*Primary Examiner*—Philip H. Leung
*Attorney, Agent, or Firm*—Kajane McManus

[57] ABSTRACT

The formula preparation device comprises a housing within which a reciprocating semi-cylindrical closed ended sleeve is located. The sleeve, in conjunction with a semi-cylindrical concavity in a cover of the device, produces a cylindrical cavity within which a formula bottle is horizontally agitated, while being heated to provide a warmed, agitated bottle of formula.

3 Claims, 1 Drawing Sheet

5,808,276

DEVICE FOR UNATTENDED SIMULTANEOUS HEATING AND AGITATING OF A BOTTLE OF INFANT FORMULA

BACKGROUND OF THE INVENTION

The formula preparation device of the present invention provides a warmed bottle of baby formula while a caregiver is freed to attend to other needs of an infant. More particularly, the formula preparation device agitates a bottle containing formula as it warms same, without being attended, so that the formula, such as that made from concentrate or powder, is blended and warmed, and made available for use without requiring the caregiver to attempt producing the formula one handedly while cradling an infant in the other, or, alternatively, by ignoring the infant while involved in the process of preparing a bottle of formula.

PRIOR ART

Heretofore, formula preparation, particularly in the wee hours of the morning, has at times been a harrowing experience. A caregiver is often very tired, particularly when responsible for a very young infant, is awakened rudely by the screaming little human, and stumbles around, possibly in the dark, prior to being fully awake, trying to produce a warmed bottle of formula to quiet the hungry infant.

The caregiver will typically either make the formula while the infant cries loudly in its crib, waking other family members, or, the caregiver may first pick up the crying infant and attempt to soothe the infant by holding the infant in one arm while trying to mix, agitate and, last if not least, trying to warm the bottle of formula with the other free hand. Further, the hand of the arm holding the infant needs to be used, with juggling of the infant being required. These attempts are often frustrating because, for example, if the nipple engaging cap does not seat appropriately, agitation will send the formula flying. Further, testing of the formula temperature is also not easily accomplished one handedly. Still further, when bottles requiring liners are used, the liner must be held in appropriate position so as not to unseat during filling, and must be held seated until a nipple cap is threaded thereover to secure the engagement.

All in all, such seemingly simple procedure is further compounded in complexity when attempted by one who is not fully awake.

To eliminate such complications, the formula preparation device described herein is proposed.

Numerous food preparation devices are known, as listed below, however, none of these are for producing a warmed, agitated bottle of formula.

| U.S. Pat. No. | Patentee | Title |
| --- | --- | --- |
| 4,302,111 | Harris | Method and Apparatus for the Continuous Production of Thermally Processed Food Slurries |
| 4,441,016 | Oata et al | Electric Rice Cooker |
| 4,664,529 | Cavalli | Ice cream-Making Household Appliance Incorporating an Automatic Stirring Paddle Stopping Device |
| 4,693,610 | Weiss | Electrical Household Appliance for Culinary Purpose |
| 4,763,060 | Santa Cruz | Apparatus for Controlled Heating and Dispensing of a Mixed Liquid and Solid Material |
| 4,802,407 | Negri et al | Automatic Electric Household Appliance for Making Cheese and By-Products Thereof |
| 5,363,746 | Gordon | Automatic Food Preparation Device |

SUMMARY OF INVENTION

Accordingly, it is a primary object of the invention to provide a structure which will simplify formula making.

It is a further object, to free the caregiver from overseeing the formula making, allowing an infant to obtain almost immediate and continued attention and soothing.

It is yet a further object to provide a safe formula preparation device.

It is yet a further object to provide a formula preparation device which limits the temperature to which formula is warmed.

It is a further object to provide a formula preparation device which can accommodate a variety of formula bottle configurations.

These as well as other objects are met by the formula preparation device of the present invention which comprises a housing within which an agitator device is mounted, the formula preparation device further including heating apparatus therein for warming the bottled formula while the bottle is being agitated, and the housing further including a safety switch for causing inoperability when a cover of the housing is open.

DESCRIPTION OF THE PREFERRED EMBODIMENT

Figure 1:
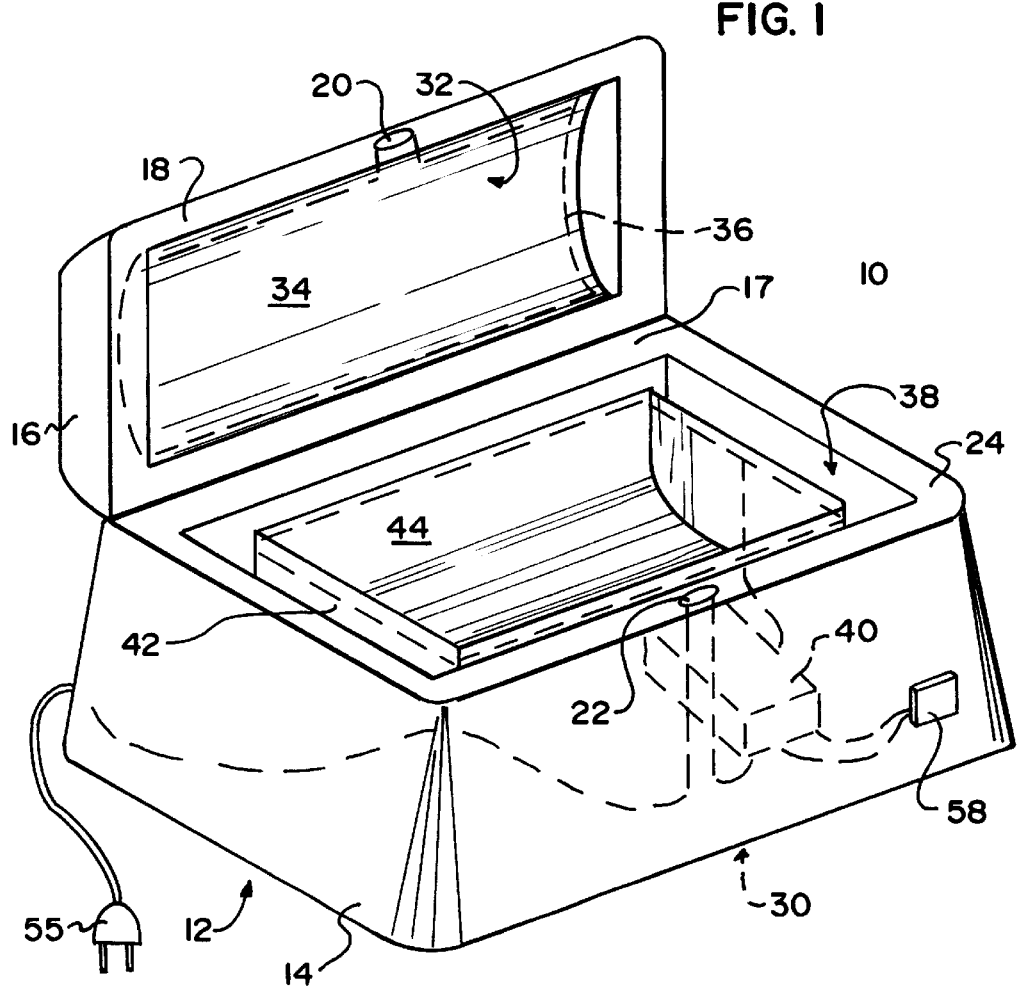
FIG. 1 is a perspective view of the formula preparation device of the present invention and shows one possible generic electrical circuit for same in phantom.

Referring now to the drawings in greater detail, there is illustrated therein the formula preparation device made in accordance with the teachings of the present invention and generally identified by the reference numeral 10.

As shown, the formula preparation device 10 includes a two piece housing 12 including a base 14 and a cover 16 hingedly fixed along one top side edge surface 17 of the base 14. A swing edge 18 of the cover 16 has a metal contact 20 thereon which engages a cooperating metal contract 22 on a opposite top side edge surface 24 of the base 14 upon which the swing edge 18 rests when the cover 16 is closed. The contact 20 in the cover 16 when abutted against contact 22 in the side edge surface 24 of the base 14 creates a closure in an electrical circuit 30 (shown in phantom) of the formula preparation device 10, assuring that operation of the formula preparation device 10 is possible only when the cover 16 is closed.

The cover 16 is further seen to incorporate an elongate cylindrical concavity 32 therein which incorporates one embodiment of a heating apparatus 34, shown here as a heating pad liner 34 similar in waterproof configuration to a waterbed heater. It will be seen that current for heating the heating apparatus 34 in the concavity 32 of the cover 16 is provided by a sub-circuit 36 which begins and ends at the metal contact 20 in the cover 16.

Looking into and within the base 14, it will be seen that a cavity 38 occupies a major area within the base 14. Seated within this cavity 38 is a motor 40 which is functionally engaged to a semi-cylindrical, closed ended sleeve 42 in a manner to cause the sleeve 42 to reciprocate in an end to end manner when the motor 40 is activated. Such action may be easily accomplished using any of a plurality of known generic systems, i.e., such as a small, low power version of the power system used in a jackhammer, or as used to operate a sewing machine needle.

The cavity 38 and concavity 32 are seen to be of a greater horizontal extent than a predefined length of the sleeve 42. Such greater horizontal extent is required to accommodate the reciprocating motion of the sleeve 42 without interfering with the reciprocation.

Figure 2:
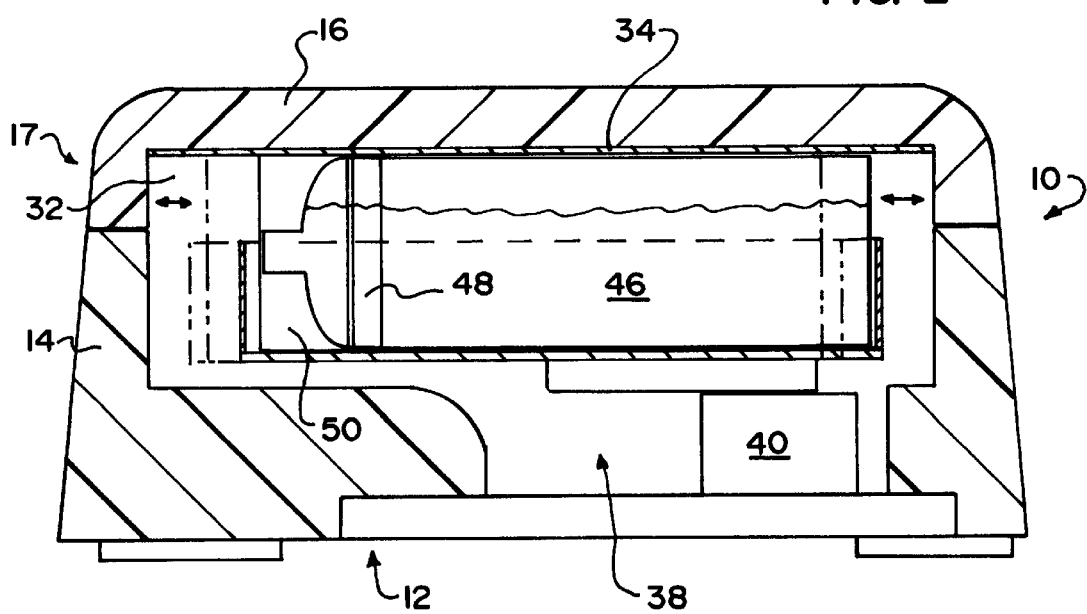
FIG. 2 is a cross sectional side view through the formula preparation device of the present invention showing a covered formula bottle therein, the formula bottle being agitated as indicated by the arrows while the formula therein is being warmed.

It will be further seen that the sleeve 42 is also lined in this embodiment with a heating apparatus 44 similar to the heating apparatus liner 34 lining the cover concavity 32. Thus, when a caregiver places a bottle 46 of pre-made cold formula into the sleeve 42, as shown in FIG. 2, the bottle 46 including a nipple 47 having a nipple cap 48 engaged thereover, and further including an overcap 50, and closes the cover 16 of the device 10, a substantially complete circuit 30 is formed via the cooperating contacts 20 and 22 and the formula preparation device 10 is ready to function.

The formula preparation device 10 is shown here as operated by household current by means of a plug 55 but could also, if desired, be battery powered.

Further, to prevent overheating of the formula, the circuit 30 includes a timed 'ON' switch 58, activation of the switch 48 allowing current to flow, the timed switch 58 being set to shut the formula preparation device 10 off after a predefined time period which will warm the formula to a desired temperature but will not overheat it.

Thus, a caregiver need merely lay the bottle 46 of formula in the sleeve 42, close the cover 16, and activate switch 58, either while, or just prior to, attending to the needs of a wakened infant, in either case, needing only one hand to produce an agitated, warmed bottle 46 of formula for the hungry child.

It will be understood that should one open the cover 16 prior to completed warming and agitation, that the agitation and heating will stop because contacts 20 and 22 are separated, opening circuit 30. Also, to provide equal power for agitation and warming, it is proposed that the motor 40, and heating apparatus 34 and 44 be engaged in the circuit 30 in parallel manner.

Although the heating apparatus 34 described above is shown as a waterproof heating pad liner 34, 44, this should not be construed as limiting. For example, heating could be accomplished with a heat lamp, or alternatively, the bottle 46 itself could incorporate means for heating the formula therein, such as by an induction process.

Also, if desired, agitation of the formula may be enhanced by the provision of an acoustic wave generator, and such wave generator may concurrently serve as one embodiment of the heating apparatus 34.

As described above, the formula preparation device 10 provides a number of advantages, some of which have been described above and others of which are inherent in the invention. Also, modifications may be proposed to the formula preparation device 10 without departing from the teachings herein. Accordingly, the scope of the invention is only to be limited as necessitated by the accompanying claims.

I claim:

1. An infant formula preparation device comprising a housing having a base and a cover and within the base of which a reciprocating semi-cylindrical closed ended sleeve is located, the sleeve, in conjunction with a semi-cylindrical concavity in the cover of the formula preparation device, producing a cylindrical cavity, within which a filled infant formula bottle is horizontally disposed and agitated, the formula bottle containing formula and the formula being heated by a current operated heating apparatus within the housing, and the sleeve being engaged to a current operated motor in the base of the housing in a manner to produce end to end reciprocation of the sleeve to produce a simultaneously warmed and agitated bottle of infant formula.

2. The device of claim 1 wherein said heating apparatus and said motor are engaged to a source of current and wherein said cover is hingedly mounted to one side edge of said base and has an opposite swing edge which engages upon an opposite side edge of said base, the swing edge of the cover and the cooperating side edge of the base each being provided with cooperating contacts also engaged to the source of current in a manner such that, when the cover is opened, the contacts disengage and reciprocation of the sleeve and warming of the formula cease.

3. The device of claim 2 further including a timed "ON" switch which controls duration of current flow when the cooperating contacts are engaged.

* * * * *